United States Patent
Lipfert et al.

(10) Patent No.: US 9,902,316 B2
(45) Date of Patent: Feb. 27, 2018

(54) STEERING-COLUMN SWITCH UNIT FOR A MOTOR VEHICLE, AND MOTOR VEHICLE HAVING A STEERING-COLUMN SWITCH UNIT

(71) Applicant: VALEO Schalter and Sensoren GmbH, Bietigheim-Bissingen (DE)

(72) Inventors: Rainer Lipfert, Heilbronn (DE); Martin Hasch, Schwieberdingen (DE); Karl Simonis, Illingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/368,006

(22) PCT Filed: Nov. 29, 2012

(86) PCT No.: PCT/EP2012/073892
§ 371 (c)(1),
(2) Date: Jun. 23, 2014

(87) PCT Pub. No.: WO2013/092149
PCT Pub. Date: Jun. 27, 2013

(65) Prior Publication Data
US 2015/0001051 A1  Jan. 1, 2015

(30) Foreign Application Priority Data
Dec. 24, 2011 (DE) .......................... 10 2011 122 405

(51) Int. Cl.
*B60Q 1/42* (2006.01)
*H01H 25/04* (2006.01)
(Continued)

(52) U.S. Cl.
CPC .............. *B60Q 1/425* (2013.01); *B60Q 1/343* (2013.01); *H01H 21/22* (2013.01); *H01H 25/04* (2013.01);
(Continued)

(58) Field of Classification Search
CPC . B60Q 1/425; B60Q 1/40; B60Q 1/34; B60Q 1/4253; H01H 25/04; H01H 21/22; H01H 2207/004; H01H 2231/026
(Continued)

(56) References Cited

U.S. PATENT DOCUMENTS 4,748,298 A * 5/1988 Chretien ................ H01H 13/60
200/61.27
6,069,329 A   5/2000 Weiss et al.
(Continued)

FOREIGN PATENT DOCUMENTS

DE      44 18 328 A1     11/1995
DE      694 14 867 T2     5/1999
(Continued)

OTHER PUBLICATIONS

International Search Report for corresponding International Application No. PCT/EP2012/073892, dated Mar. 5, 2013 (2 pages).

*Primary Examiner* — Felix O Figueroa
(74) *Attorney, Agent, or Firm* — Osha Liang LLP (57) ABSTRACT

The invention relates to a steering-column switch unit (1) for a motor vehicle, having a driver part (7) to which an actuating lever (2) can be connected and which is mounted so as to be pivotable about a pivot axis (11) between an initial position and an actuated position, wherein the driver part (7) has an arm (20) which extends perpendicular to the pivot axis (11), in particular in the direction of a steering spindle, and which projects from a main body (16) of the driver part (7), on which arm there is arranged an electrical (Continued)

contact element (8) which, in the actuated position, can be electrically coupled to a further contact element, and having a resetting device (6) with a triggering element (10) which is designed for resetting the driver part (7), and thus the actuating lever (2), from the actuated position into the initial position, wherein the triggering element (10) is arranged on a side of the arm (20) situated opposite the electrical contact element (8).

10 Claims, 9 Drawing Sheets

(51) Int. Cl.
  *H01H 21/22*  (2006.01)
  *B60Q 1/34*  (2006.01)
(52) U.S. Cl.
  CPC . *H01H 2207/004* (2013.01); *H01H 2231/026* (2013.01)

(58) Field of Classification Search
  USPC ...................................................... 200/61.35
  See application file for complete search history.

(56) References Cited

U.S. PATENT DOCUMENTS 6,186,022 B1   12/2001  Ishikawa
6,587,045 B2*  7/2003  Sano ..................... B60Q 1/425
                                                  200/61.27

FOREIGN PATENT DOCUMENTS

EP    1 060 949 A2   12/2000
FR    2 607 961 A2    6/1988
FR    2 872 111 A1   12/2005

\* cited by examiner

STEERING-COLUMN SWITCH UNIT FOR A MOTOR VEHICLE, AND MOTOR VEHICLE HAVING A STEERING-COLUMN SWITCH UNIT

The invention relates to a steering-column switch unit for a motor vehicle, having a driver part to which an actuating lever—which can be actuated by the vehicle driver—can be connected and which is mounted so as to be pivotable about a pivot axis between an initial position and an actuated position, wherein the driver part has an arm which extends perpendicular to the pivot axis, in particular in the direction of a steering spindle, and which projects from a main body of the driver part, on which arm there is arranged an electrical contact element which, in the actuated position, can be electrically coupled to a further contact element, which is attached for example to a printed circuit board. The steering-column switch unit also comprises a resetting device with a triggering element which is designed for automatically resetting the driver part, and thus the actuating lever, from the actuated position into the initial position. The invention also relates to a motor vehicle.

Resetting devices for steering-column switches—so-called turn indicator resetting means—already fall within the prior art. For example, document U.S. Pat. No. 6,186,022 B1 describes a resetting device of said type which has a triggering element in the form of a tongue or a finger which, as the steering wheel rotates, is driven along and then effects the resetting of the steering-column switch or of the actuating lever into its initial position. Here, said triggering element is on the one hand mounted so as to be pivotable; on the other hand, said triggering element is also mounted so as to be displaceable, specifically in a sliding direction, in which the triggering element is also arranged under the preload of a spring element. When the triggering element is driven along as the steering wheel rotates, the triggering element pushes the steering-column switch back into its initial position.

A resetting device for a steering-column switch is also known from document DE 694 14 867 T2.

A generic resetting device is also disclosed in DE 44 18 328 A1. Said resetting device additionally has a switch override protection means which, in a switch override situation—when the vehicle driver exerts a force on the steering-column switch as the steering wheel rotates back toward a centre position—permits a movement of the triggering element relative to the actuating lever and thus prevents destruction of the triggering element. Said switch override protection means generally comprises a switch override spring which deflects under the action of a certain force and thus prevents destruction of the resetting unit.

It is considered to be a disadvantage of the prior art that, owing to an arrangement of the resetting device—and in particular the triggering element—in a switch cover, two separate or multiple separate printed circuit boards are required for the electronic components. Specifically, the electrical contact element of the switch must be arranged spatially separate from a control unit on a separate printed circuit board.

It is an object of the invention to specify a solution with which, in the case of a steering-column switch unit of the type mentioned in the introduction, the available structural space can be saved, and in particular the use of separate printed circuit boards can be dispensed with.

Said object is achieved according to the invention by means of a steering-column switch unit and by means of a motor vehicle having the features of the respective independent patent claims. Advantageous embodiments of the invention are defined in the dependent patent claims, the description and the figures.

A steering-column switch unit according to the invention for a motor vehicle comprises a driver part to which an actuating lever can be connected and which is mounted so as to be pivotable about a pivot axis between an initial position and an actuated position, specifically in particular relative to a steering column part in which the steering spindle is rotatably mounted. The driver part has an arm which extends perpendicular to the pivot axis and which points in particular in the direction of a steering spindle and which projects from a main body of the driver part, on which arm there is arranged an electrical contact element which, in the actuated position, can be electrically coupled to a further contact element. The steering-column switch unit furthermore has a resetting device with a triggering element which is designed for resetting the driver part, and thus the actuating lever, from the actuated position into the initial position. It is provided according to the invention that the triggering element is arranged on a side of the arm situated opposite the electrical contact element.

In other words, a core concept of the invention thus consists in that the electrical contact element is arranged on one side of the arm, whereas the resetting device, that is to say the triggering element of the resetting device, is arranged on the other side. Dual functionality of the arm of the driver part is thus realized, such that one and the same arm, at one side, bears the electrical contact element and, at the other side, also serves for example for guiding the triggering element of the resetting device. It is thus the case that the at least one contact element is arranged on one side, and the triggering element is preferably also arranged on the other side, of a common arm. By means of such a configuration of the driver part, use can be made of a common printed circuit board on which both the further contact element—that is to say a switch—and also the further electronic components, such as for example a control unit and the like, are arranged. There is no need to use additional printed circuit boards. This has the advantage in particular that the available structural space can be saved, and furthermore, the number of components can be reduced to a minimum, such that a robust and reliable steering-column switch unit can be realized.

Is preferable for a guide, in particular a slotted guide, for a peg of said triggering element to be formed on the arm, along which guide the peg can move during the movement of the actuating lever between the initial position and the actuated position. It is thus the case that one and the same arm performs two different functions: firstly the function of bearing the electrical contact element, and secondly also the function of guiding the resetting device. The use of further arms, with the associated disadvantages, is thus made superfluous.

The guide, in particular the slotted guide, is preferably formed on a side of the arm situated opposite the electrical contact element or facing away from the contact element. On that side of the contact element there is thus also adequate structural space available for further contact elements or for a printed circuit board.

The resetting device is preferably arranged on, or integrated into, a detent part which has a detent structure for the engagement of the actuating lever with detent action when said actuating lever is in its actuated position. In this way, the steering-column switch unit is particularly compact.

It has proven to be particularly advantageous for the steering-column switch unit to have a printed circuit board on which the further contact element is arranged. In this embodiment, the arm can be arranged between the printed circuit board at one side and the triggering element at the other side. In particular, in this case, the arm extends substantially parallel to the printed circuit board and in particular also parallel to the triggering element of the resetting device, such that overall, a sandwich-type structure is created in which the arm of the driver part is arranged in an intermediate space between the printed circuit board at one side and the resetting device or the triggering element at the other side, and bridges the gap between the printed circuit board and the resetting device. Such an arrangement has the advantage that the printed circuit board can also wear electronic components for other steering-column switches, such that the printed circuit board is a common printed circuit board for multiple steering-column switches.

The arm thus projects from the main body of the driver part, specifically in particular in the direction of the steering spindle. The arm thus points in the direction of the steering spindle, that is to say in a direction perpendicular to the pivot axis of the driver part. Here, the arm preferably projects from a region of the main body which forms an outer edge of the main body as viewed along the pivot axis. Here, it is provided in particular that the arm terminates flush with the main body. The arm is in particular also of the plate-shaped form or in the form of a flat element.

As already stated, the resetting device has a triggering element by means of which the driver part can be moved from the actuated position into the initial position and which is mounted on an intermediate piece so as to be pivotable about a pivot axis between a rest position and a triggering position in which the driver part can be moved into the initial position. The triggering element may furthermore be mounted on the intermediate piece so as to be displaceable in a sliding direction perpendicular to the pivot axis, and a spring element may be provided which is designed to generate a spring force which acts parallel to the sliding direction and with which the triggering element is arranged under preload on the intermediate piece. In particular, the triggering element extends perpendicular to the steering spindle and can be driven along as the steering wheel rotates, such that as the steering wheel rotates, the triggering element is pivoted and thus pushes the driver part from the actuated position into the initial position. A resetting movement of the driver part is thus possible in a technically simple and particularly reliable manner.

The intermediate piece preferably has a guide surface which is formed perpendicularly to the pivot axis and on which the triggering element is mounted or supported. Here, means may be provided which press the triggering element against the guide surface in a direction parallel to the pivot axis. The triggering element can thus be arranged so as to bear against a guide surface of the intermediate piece, which guide surface is formed perpendicularly to the pivot axis of the triggering element, wherein pressing means may be provided by which the triggering element is pressed against the guide surface—that is to say in the direction parallel to the pivot axis. It is thus made possible for the triggering element to be arranged on the intermediate piece without play in the direction of the pivot axis. Specifically, it has been found that, with such an arrangement, no rattling noises are generated during the resetting of the actuating lever. It is achieved in this way that no disturbing noises are perceptible to the vehicle driver, whereby, in turn, the comfort of the vehicle driver when driving the motor vehicle is improved.

The stated means may be designed such that a spring force acts on the triggering element toward the guide surface, such that the spring force presses or preloads the triggering element against the guide surface. Said spring force may in particular be the spring force of the stated spring element, which has a force component in the direction parallel to the pivot axis of the triggering element and thus presses the triggering element against the guide surface. By means of a spring force, it is possible for tolerances to be compensated, such that it is made possible for the triggering element to be arranged or mounted on the intermediate piece without play at all times.

In a preferred embodiment of the invention, it is provided that a slide element is mounted on the intermediate piece so as to be displaceable in the sliding direction, which slide element is supported at one side on a wall of the intermediate piece via the spring element and at the other side on the triggering element, such that the spring force of the spring element is exerted on the triggering element via the slide element, and thus the triggering element is arranged on the intermediate piece under preload in the sliding direction. By means of a slide element of said type, it is firstly possible for the preload of the triggering element in the sliding direction to be realized without a great deal of outlay and in a compact manner; secondly, it is also possible in this way for the triggering element to be pressed against the guide surface in an effective manner.

The slide element and/or the spring element are/is preferably a constituent part of the above-stated means by which the triggering element is pressed against the guide surface.

It is particularly preferable for the slide element to have a projection which projects perpendicular to the pivot axis and in the direction of the triggering element and which bears at least in regions against a side of the triggering element facing away from the guide surface and which presses the triggering element against the guide surface in the direction parallel to the pivot axis. By means of a projection of said type, it is possible for a force component of the spring element to be generated in the direction parallel to the pivot axis, such that the use of an additional spring element, with the associated disadvantages with regard to costs and structural space, is eliminated. The spring force of the spring element that is provided in any case can, by means of a projection of said type, be split into two force components, specifically a force component in the sliding direction and a force component in the direction parallel to the pivot axis.

It has proven to be advantageous here for the projection to have a supporting bevel on which the triggering element is supported. It is specifically then possible, without great outlay, to achieve that a force component of the spring element, which extends in the sliding direction, is generated in the direction parallel to the pivot axis and thus perpendicular to the sliding direction. Furthermore, the supporting bevel makes it possible for the respective face sides, which face one another, of the slide element on the one hand and of the triggering element on the other hand to be arranged with a small spacing to one another such that the spring force is transmitted to the triggering element via the supporting bevel—in particular exclusively via the supporting bevel. Said spring force then—as already stated—has a force component in the sliding direction and a force component perpendicular thereto, by means of which the triggering element is pressed against the guide surface. In particular, the supporting bevel runs at an angle of 30° to 60° with respect to the sliding direction or the pivot axis.

The slide element may extend through a passage opening that is formed in the intermediate piece, and the slide element may be mounted in a displaceable manner on a further guide surface of the intermediate piece, which further guide surface is formed on a side of the intermediate piece situated opposite the guide surface for the triggering element. It can be achieved in this way that the triggering element is, in effect, clamped between its guide surface at one side and the above-mentioned projection of the slide element at the other side, while the slide element engages behind the further guide surface through the passage opening of the intermediate piece. A stable and slippage-free arrangement of the slide element and of the triggering element on the intermediate piece is thus ensured.

The slide element and the triggering element preferably have respective face sides facing toward one another. One of the face sides, specifically in particular that of the slide element, preferably has a convex curvature, whereas the other face side preferably has a concave curvature. It may be provided here that the radius of the convex curvature is greater than or equal to the radius of the concave curvature. It can thus be achieved that the clacking noises during the resetting movement of the actuating lever into its initial position are reduced to a minimum. Specifically, it is possible in this way for the two face sides, which are preferably kept spaced apart to a small extent owing to the supporting bevel, to be prevented from coming into contact with one another, and generating a noise, during the resetting movement of the actuating lever.

In one embodiment, the triggering element has a tongue element which is of elongate form and which extends perpendicular to the pivot axis, in particular in the sliding direction, which tongue element is driven along during the steering return movement when exiting a bend, or during the rotation of the steering wheel, and moves the actuating lever of the steering-column switch into the initial position. A bearing part may project from the tongue element parallel to the pivot axis, via which bearing part the pivot axis runs and by means of which bearing part the triggering element is mounted on the intermediate piece. Said bearing part may be that which bears against the guide surface of the intermediate piece and which is thus pivotably mounted on the intermediate piece. Said bearing part is in particular formed in one piece with the tongue element. By means of such a design of the triggering element, it is possible to achieve a spatial separation between the tongue element on the one hand and the intermediate piece or the bearing part on the other hand, such that the intermediate piece itself may even be arranged with an arbitrary spacing to the tongue element, wherein this does not impair the correct functioning of the resetting device.

The guide surface for the triggering element is preferably formed on a side of the intermediate piece which faces away from the tongue element, and the intermediate piece preferably has a passage opening through which the bearing part extends and engages behind the guide surface. It is thus made possible for the triggering element to be arranged in a stable and rattle-free and/or play-free manner in the direction parallel to the pivot axis of the triggering element.

The steering-column switch unit preferably has a switch override protection unit with at least one switch override spring which, in a switch override situation, permits a movement of the intermediate piece relative to the actuating lever. A switch override protection unit of said type protects the resetting device, specifically in particular the triggering element, against damage.

It has proven to be particularly advantageous for the at least one switch override spring and the spring element to be arranged adjacent to one another in a direction perpendicular to the sliding direction. This means in particular that the switch override spring and the spring element are arranged at the same height such that a projection of the switch override spring in a direction perpendicular to its spring axis or perpendicular to the sliding direction exists on the spring element. In particular, the switch override spring and the spring element are arranged parallel and adjacent to one another. By contrast to the prior art—in which the spring element and the switch override spring are for example arranged in series or in an in-line configuration—this embodiment serves to realize a particularly short and compact arrangement of the two resilient elements, which offers advantages in particular with regard to tolerance compensation. The switch override spring and the spring element may in particular be arranged relative to one another such that at least a predominant part of the length of the spring element—in particular the entire spring element—overlaps the switch override spring in a direction perpendicular to the spring axis.

The switch override protection unit may be arranged on a detent part which has a detent structure for the engagement of the actuating lever with detent action when said actuating lever is in the actuated position. A particularly compact arrangement is created as a result of the integration of the switch override protection unit into the detent part.

A motor vehicle according to the invention has a steering-column switch unit according to the invention. The preferred embodiments discussed with regard to the steering-column switch unit according to the invention, and the advantages thereof, apply correspondingly to the motor vehicle according to the invention.

Further features of the invention will emerge from the claims, from the figures and from the description of the figures. All of the features and combinations of features mentioned above in the description, and the features and combinations of features mentioned below in the description of figures and/or shown on their own in the figures, can be used not only in the respectively specified combination but also in other combinations or individually.

The invention will now be explained in more detail on the basis of a preferred exemplary embodiment and also with reference to the appended drawings, in which:

FIGS. 9 and 10 show different embodiments of the resetting device;

Figure 1:
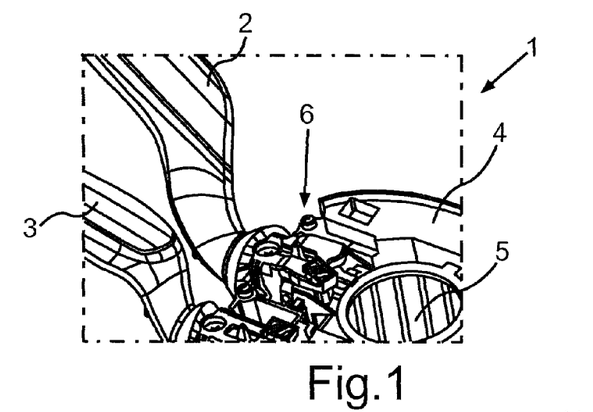
FIG. 1 shows, in a schematic and perspective illustration, a steering-column switch unit according to one embodiment of the invention.

FIG. 1 shows, in a schematic and perspective illustration, a steering-column switch unit 1 which can be installed in a motor vehicle. The steering-column switch unit 1 has, in this case, a first and a second actuating lever 2, 3, wherein, for example, the first actuating lever 2 serves for the activation of a turn indicator of the motor vehicle. The actuating levers 2, 3 are pivotably mounted on a steering column part 4 in which there is formed a receptacle 5 for a steering spindle. The receptacle 5 is of approximately circular cross-sectional form and constitutes, in effect, a sleeve for the steering spindle. At least the first actuating lever 2, which serves for the activation of a turn indicator, is assigned a resetting device 6 by means of which the actuating lever 2 can be moved from its actuated position, in which the turn indicator is activated, into an initial position, in which the turn indicator is deactivated, specifically automatically, solely as a result of the rotation of the steering wheel (not illustrated). It is self-evident here that two actuated positions are provided, specifically one for the left-hand turn indicator and one for the right-hand turn indicator.

Figure 2:
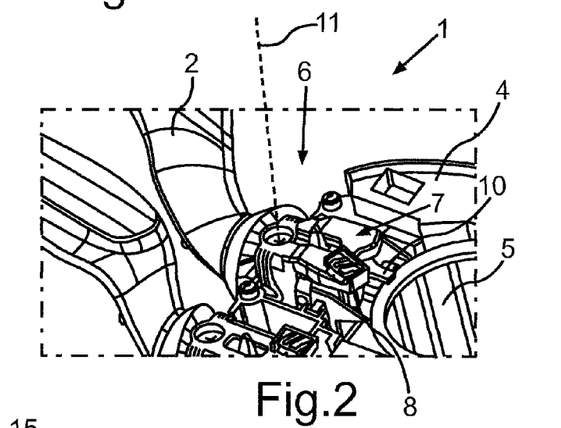
FIG. 2 shows, in a schematic and perspective illustration, an enlarged view of the steering-column switch unit as per FIG. 1.

FIG. 2 shows the resetting device 6 in an enlarged illustration. The resetting device 6 is assigned a driver part 7 to which electrical contact elements 8 are attached.

Figure 3:
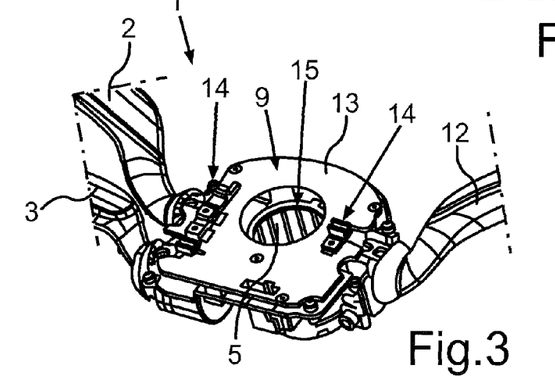
FIG. 3 shows, in a schematic and perspective illustration, the steering-column switch unit with a printed circuit board.

If the actuating lever 2 is moved into its actuated position, the electrical contact elements 8 make contact with corresponding contact elements arranged on a printed circuit board 9 (see FIG. 3). Here, the contact elements 8 are arranged on a side of the driver part 7 facing toward the vehicle driver during the operation of the motor vehicle.

As can also be seen from FIG. 2, the resetting device 6 comprises a triggering element 10 which, as the steering wheel rotates during the steering return movement when exiting a bend, is driven along by an element connected to the steering spindle, and is thus pivoted. In the process, the triggering element 10 pushes the driver part 7 such that the actuating lever 2 is moved into the initial position.

Specifically, the driver part 7 is pivotably mounted on the steering column part 4, specifically so as to be pivotable about a pivot axis 11 running parallel to the steering spindle. Furthermore, the actuating lever 2 is connected to the driver part 7. Here, it may likewise be provided that a pivoting movement of the actuating lever 2 relative to the driver part 7 is possible. It is however crucial that, during the pivoting of the actuating lever 2 from the initial position into the actuated position, the driver part is also concomitantly moved or concomitantly pivoted. The driver part 7 is thus also pivotable between the initial position and the actuated position, specifically about the pivot axis 11.

FIG. 3 illustrates the steering-column switch unit 1 with the printed circuit board 9, wherein a further actuating lever 12 is likewise visible. Said actuating lever 12 may for example serve for the activation of a windscreen wiper and/or of further functions in the motor vehicle.

As can be seen from FIG. 3, the printed circuit board 9 is a printed circuit board that is common to all of the actuating levers 2, 3, 12, such that no further printed circuit boards need to be used. Electronic components 14, such as for example control units, electrical switches and the like, are attached to the printed circuit board 9 on the side 13 facing away from the driver part 7.

The printed circuit board 9 has a circular passage opening 15 through which the steering spindle extends (not illustrated in FIG. 3). Said passage opening 15 is arranged concentrically with respect to the receptacle 5 for the steering spindle.

Figure 4:
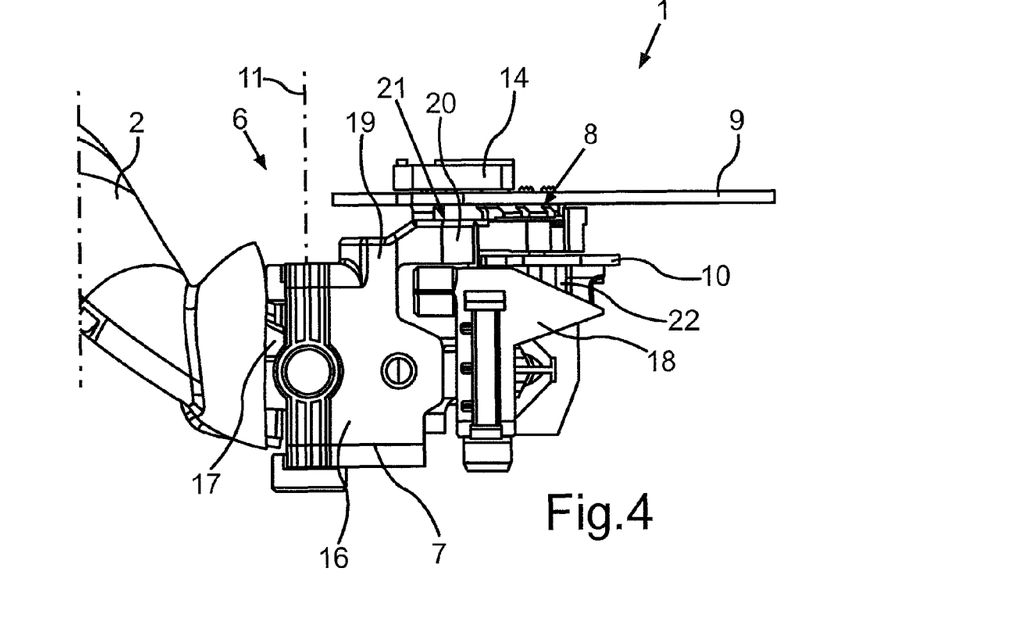
FIG. 4 shows, in a schematic illustration, a side view of the steering-column switch unit.

FIG. 4 illustrates a side view of the resetting device 6 in greater detail. Here, the design of the driver part 7 can be seen particularly clearly. The driver part 7 has a main body 16 which is a hollow body and through which a detent pin 17 of the actuating lever 2 extends. Here, the detent pin 17 extends to a detent part 18 on which there is formed a detent structure for the engagement of the detent pin 17 with detent action in the actuated position and in the initial position. Said detent structure is formed on a side of the detent part 18 facing toward the actuating lever 2. The detent pin 17 thus ends at the detent structure and slides along the latter, and can engage into detent depressions formed in said detent structure.

An arm 20 which is of substantially plate-like form projects from an edge 19 of the main body 16 of the driver part 7, said edge facing toward the printed circuit board 9, which arm extends in a direction perpendicular to the pivot axis 11 of the driver part 7 and points in the direction of the steering spindle. The arm 20 is thus a plate-like element of relatively flat form which terminates flush with the main body 16 or the edge 19 of the main body 16. The electrical contact elements 8 are attached to a side 21 of the arm 20 facing toward the printed circuit board 9 and away from the triggering element 10, which electrical contact elements can make contact with corresponding contact elements of the printed circuit board 9, specifically in the actuated position. Specifically, the corresponding contact elements which can be placed in electrical connection with the contact elements 8 are attached to that side of the printed circuit board 9 which faces toward the arm 20.

By contrast, the electronic components 14 are attached to that side of the printed circuit board 9 which faces away from the arm 20.

The triggering element 10 for the resetting of the actuating lever 2 is situated on that side of the arm 20 which is situated opposite the contact elements 8. Said triggering element 10 is mounted by way of its peg in a slotted guide of the arm 20, as will be described in more detail further below.

Also situated on that side of the arm 20 which is situated opposite the contact elements 8 is the detent part 18, and also an intermediate piece 22 that is not illustrated in its entirety in FIG. 4. The triggering element 10 is mounted on said intermediate piece 22.

Figure 5:
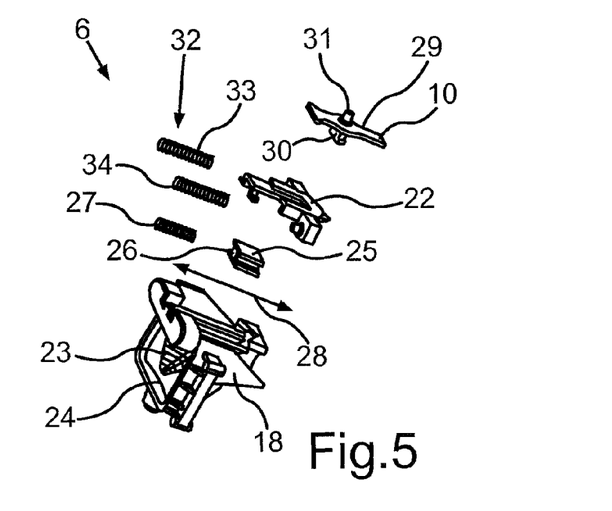
FIG. 5 shows, in a schematic and perspective illustration, individual components of a resetting device according to one embodiment of the invention.

Some components of the resetting device 6 are illustrated in more detail in FIG. 5. As already stated, the detent part 18 has a detent structure 23 which is formed on a side 24 of the detent part 18 facing toward the actuating lever 2. Said detent structure 23 may for example comprise detent openings into which the detent pin 17 of the actuating lever 2 engages, specifically in the actuated position and in the initial position. The resetting device 6 furthermore comprises a slide element 25 with a sleeve 26 in which a spring element 27 in the form of a spiral spring can be accommodated. As will be described in more detail further below, the slide element 25 may be mounted in displaceable fashion either on the detent part 18 or on the intermediate piece 22, specifically so as to be displaceable in a sliding direction 28 oriented perpendicularly to the pivot axis 11. The triggering element 10 is also mounted in pivotable and displaceable fashion on the intermediate piece 22. Here, the triggering element 10 has a tongue element 29 which is in the form of a strip and thus of elongate design. The tongue element 29 is thus in the form of a short bar, perpendicularly from which there projects a bearing part 30 by way of which the triggering element 10 is mounted on the intermediate piece 22. The precise design of the triggering element 10 will be described in more detail further below. The triggering element 10 also has a peg 31 which projects from that side of the tongue element 29 which is situated opposite the bearing part 30, said peg being in alignment with the bearing part 30.

The resetting device 6 furthermore includes a switch override protection unit 32 which, in the exemplary embodiment, comprises two switch override springs 33, 34. The two switch override springs 33, 34 are in the form of spiral springs. Said switch override springs 33, 34 are supported at one side on the intermediate piece 22; said switch override springs are supported at the other side on the detent part 18 and extend along the sliding direction 28.

Figures 6, 7, 8, 9A, 9B:
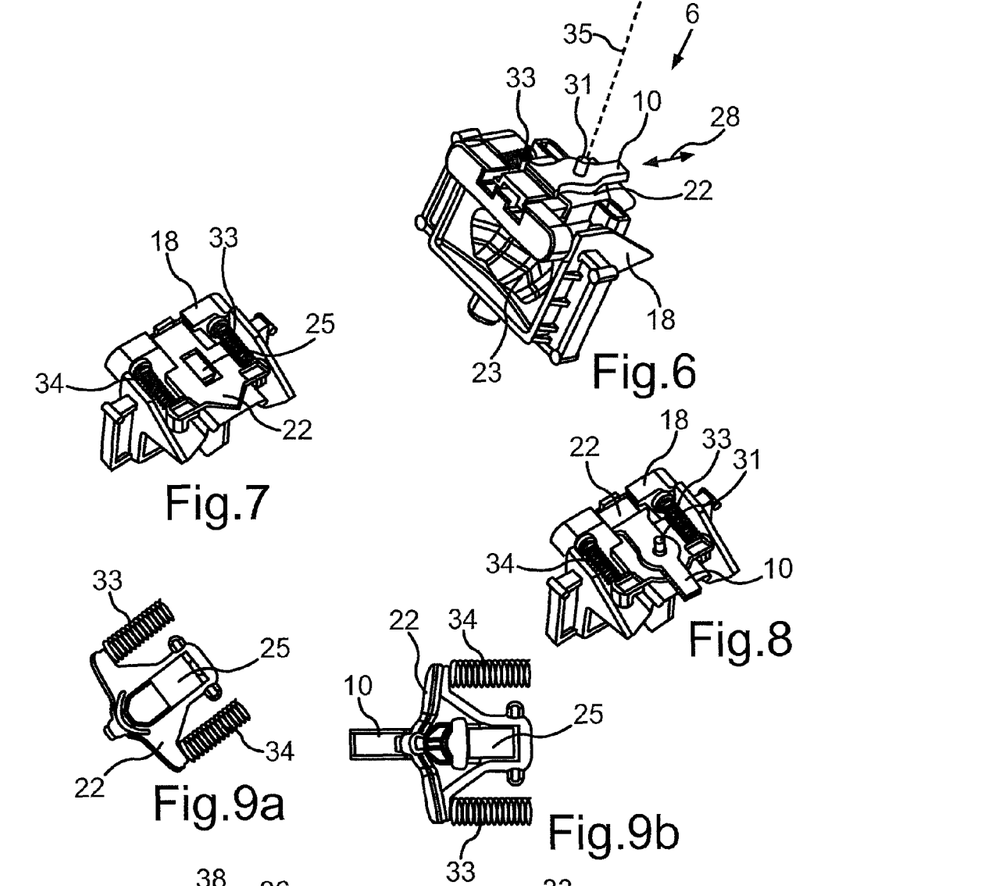
FIGS. 6 to 8 show different views of the resetting device.

FIGS. 6 to 8 illustrate different views of the detent part 18 with the intermediate piece 22 mounted thereon. In the steering-column switch unit 1, the detent part 18 is a component that is immovable relative to the steering column part 4, that is to say the detent part 18 constitutes, in effect, a positionally fixed element relative to which the driver part 7 is pivoted. By contrast, the triggering element 10 is mounted on the intermediate piece 22 and is thus also pivotable relative to the detent part 18, specifically about a pivot axis 35 running parallel to the pivot axis 11. Furthermore, the triggering element 10 is also mounted so as to be displaceable in the sliding direction 28 perpendicular to the pivot axis 35, and here, is resiliently preloaded by means of the spring element 27.

The intermediate piece 22 is also movably mounted on the detent part 18, specifically by way of the switch override springs 33, 34. Said relative movement between the intermediate piece 22 and the detent part 18 is however generated only in a switch override situation.

Figure 10A:
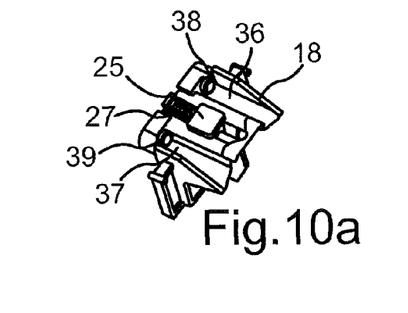
Figure 10B:
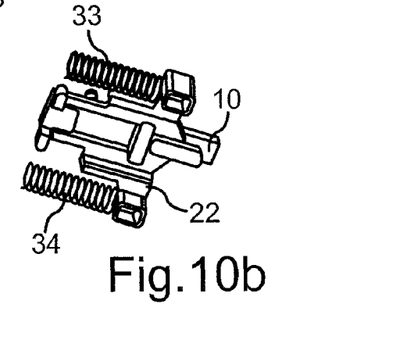

In FIG. 7, the intermediate piece 22 is illustrated without the triggering element 10, such that the slide element 25 is also visible. Here, the spring element 27 is situated in the sleeve 26 of the slide element 25 (see FIG. 5). As can be seen from FIGS. 9a and 9b, both the slide element 25 and also the triggering element 10 may be mounted on the intermediate piece 22. It may alternatively be provided that the slide element 25 is mounted on the detent part 18, whereas the triggering element 10 is mounted on the intermediate piece 22. Such a configuration is illustrated in FIGS. 10a and 10b. The spring element 27 can also be seen in FIG. 10a. Regardless of the configuration—be it the arrangement as per FIGS. 9a and 9b or the arrangement as per FIGS. 10a and 10b—the mode of operation of the resetting device 6 is the same.

As can be seen in particular from FIG. 10a, it is the case in all embodiments that the detent part 18 has two grooves 36, 37 which are of elongate form along the sliding direction 28, which grooves are formed on a side of the detent part 18 facing toward the intermediate piece 22. Said grooves 36, 37 serve for accommodating the switch override springs 33, 34 and are thus of a shape that is adapted to the shape of the springs. The grooves 36, 37 are delimited by support elements 38, 39 on which the respective switch override springs 33, 34 are supported.

It is provided in all of the embodiments that—as emerges from the figures—the spring element 27 is arranged at the level of the switch override springs 33, 34. Here, the spring element 27 lies parallel to the switch override springs 33, 34 and also, in the direction perpendicular to the spring axis, adjacent to the switch override springs 33, 34. This means that an imaginary line which runs perpendicular to the sliding direction 28 and which intersects the spring element 27 also runs perpendicularly through the switch override springs 33, 34. Such an arrangement of the switch override springs 33, 34 on both sides of the spring element 27, such that said spring element 27 is arranged between the switch override springs 33, 34 and the spring axis of the spring element 27 extends parallel to the axes of the switch override springs 33, 34, serves in particular to provide a compact design of the resetting device 6, and also has advantages with regard to the mechanical tolerances.

Figure 11:
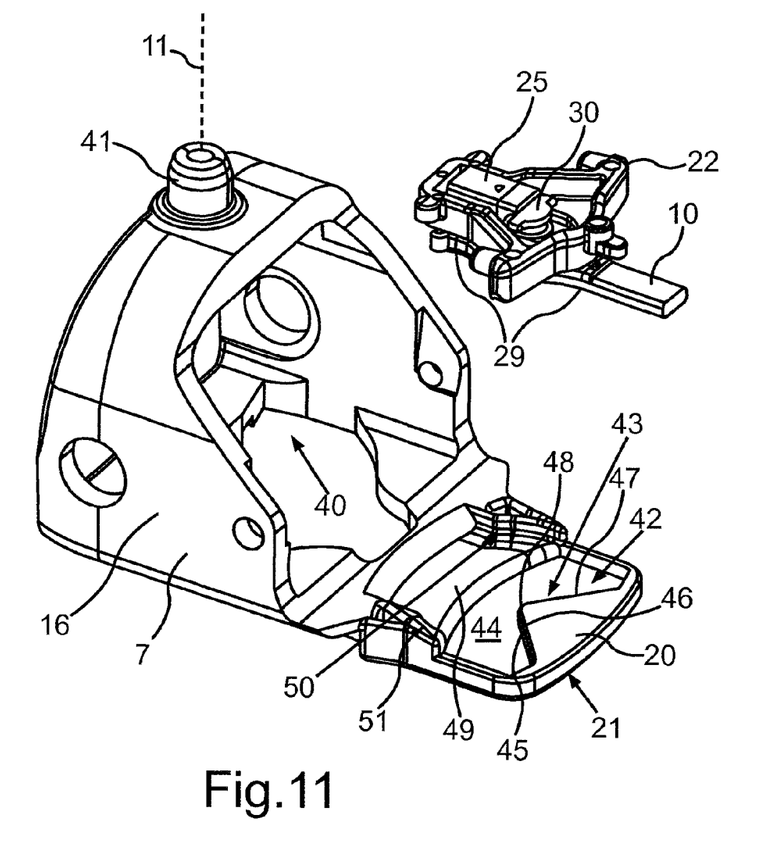
FIG. 11 shows, in a schematic and perspective illustration, the resetting device with a driver part which has an arm projecting from a main body.

FIG. 11 shows the driver part 7 in detail, specifically together with the intermediate piece 22, the triggering element 10 and the slide element 25. As can be seen from FIG. 11, the main body 16 of the driver part 7 is in the form of a hollow body which has a cavity 40 which is formed so as to be open all the way through. The detent pin 17 (see FIG. 4) extends through the cavity 40. From the main body 16 there projects a peg 41 by means of which the driver part 7 is mounted in pivotable fashion and which defines the pivot axis 11.

On a side 42 of the arm 20, said side 42 being situated opposite the side 21 and the contact elements 8 attached thereto, there is formed a slotted guide 43 which constitutes a guide for the peg 31 of the triggering element 10. Here, on the side 42 of the arm 20, there is formed a depression 44 which is delimited by a wall 45 which forms the slotted guide 43. The wall 45 and thus the slotted guide 43 are of triangular form and, in this case, have a first slotted-guide section 46 and a second slotted-guide section 47, which converge in pointed fashion. Said slotted-guide sections are linear slotted-guide sections 46, 47 which enclose an angle with one another, which angle may for example lie in a value range from 60° to 120°. Said angle may for example be 90°.

The peg 31 of the triggering element 10 then bears against the wall 45, said peg being guided along the slotted guide 43 and, in the process, being situated in the depression. When the actuating lever 2 is situated in the initial position, the peg 31 of the triggering element 10 is situated at a tip 48 of the slotted guide 43. By contrast, when the actuating lever 2 is situated in the actuated position, the peg 31 bears against the other end of the respective slotted-guide section 46, 47, specifically in a manner dependent on the direction in which the actuating lever 2 has been pivoted. Here, the tongue element 29 of the triggering element 10 slides on a surface 49 of the arm 20, said surface 49 being delimited at both sides by the webs 50, 51. At the webs 50 and 51, the driver part 7 is pushed by the tongue element 29 of the triggering element 10 during the resetting movement into the initial position. The resetting of the driver part 7 is thus performed by virtue of the respective web 50, 51 of said driver part being pushed, specifically by means of the tongue element 29.

Figure 12:
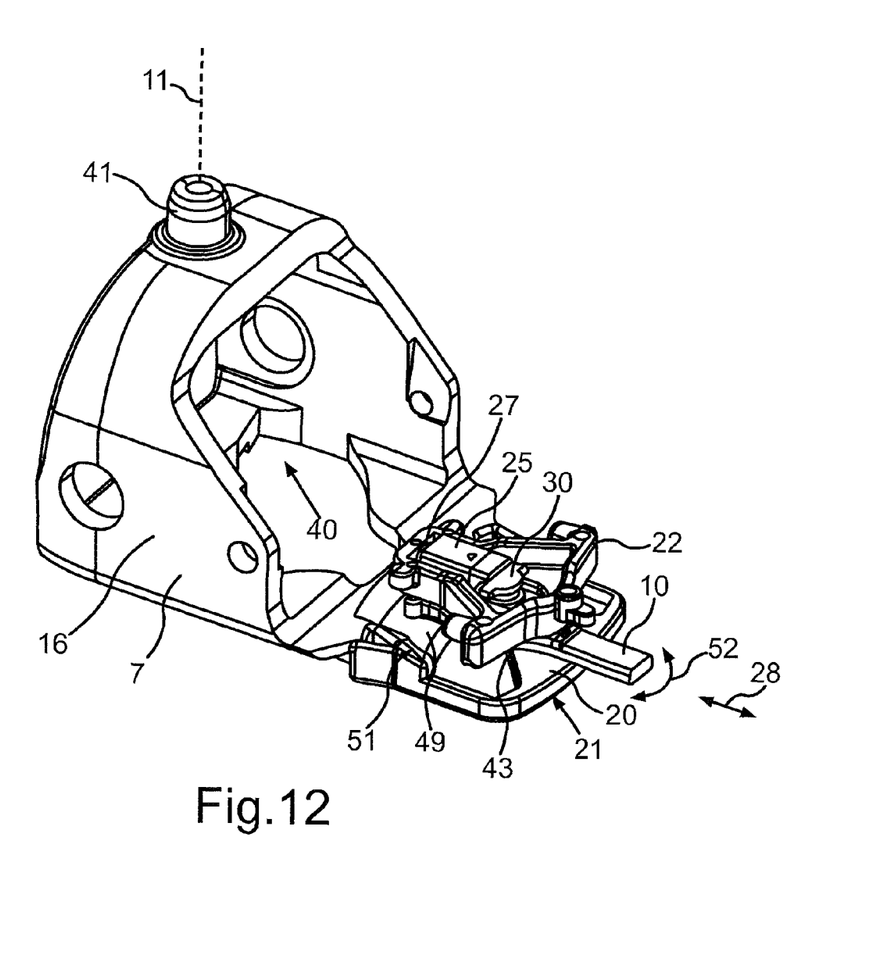
FIG. 12 shows, in a schematic and perspective illustration, the resetting device, wherein a triggering element is arranged on the driver part.

FIG. 12 illustrates the driver part 7 together with the triggering element 10 arranged thereon and the intermediate piece 22. Here, the peg 31 of the triggering element 10 faces toward the arm 20 and slides on the slotted guide 41. As already stated, the triggering element 10 can be both pivoted about the pivot axis 35 (see FIG. 6), specifically as per the arrow 52, and also displaced in the sliding direction 28. The triggering element 10 is preloaded in the sliding direction 28 by the spring force of the spring element 27.

Figure 13:
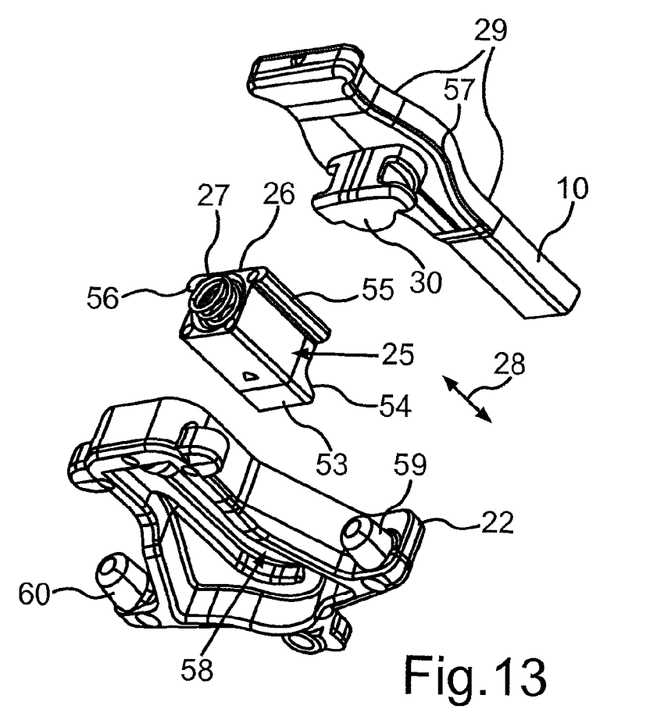
FIG. 13 shows, in a schematic and perspective illustration, a resetting device according to one embodiment of the invention, with individual components being illustrated in more detail.

Referring now to FIGS. 13 to 19, the configuration of the triggering element 10 and of the intermediate piece 22, and also of the slide element 25, will be explained in more detail. Here, FIG. 13 is an illustration of the triggering element 10 and the slide element 25 and the intermediate piece 22 separate from one another. As already stated, the slide element 25 has an axial sleeve 26 in which the spring element 27 is accommodated. The slide element 25 has a projection 53 which points in the sliding direction 28 and which in turn has a bevel 54. The slide element 25 furthermore has two laterally projecting collars 55, 56 by means of which the slide element 25 is mounted.

As already stated, the triggering element 10 has a tongue element 29 which is of elongate form and from which a bearing part 30 projects perpendicularly. A groove 57 is formed in a circumferential direction on an outer circumference of the bearing part 30, which groove, in the exemplary embodiment, has a semi-circular overall form.

The intermediate piece 22 has a passage opening 58. Furthermore, two pegs 59, 60 are formed on the intermediate piece 22, which pegs serve for supporting the above-mentioned switch override springs 33, 34. Said pegs 59, 60 likewise point in the sliding direction 28.

Figure 14:
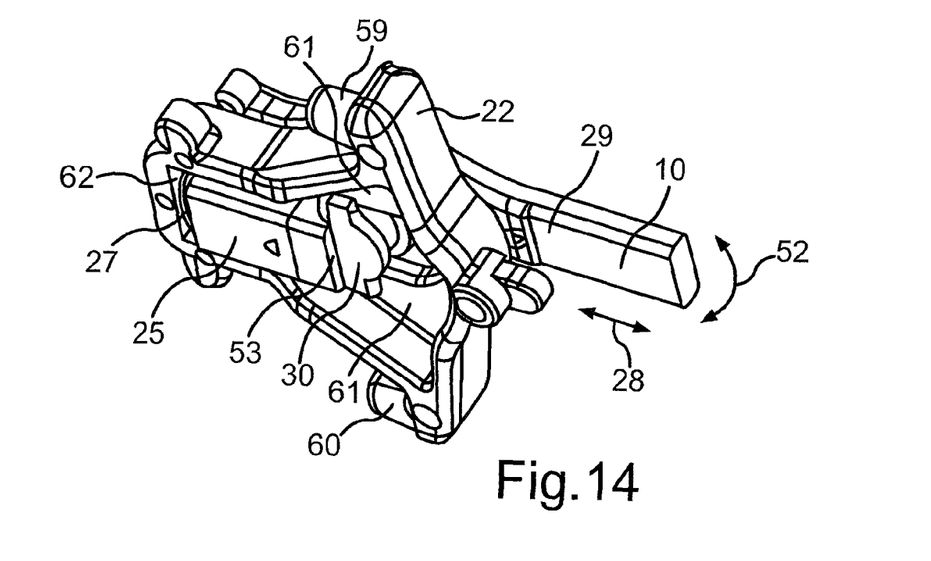
FIGS. 14 to 19 show different views of the resetting device.

As can be seen from FIG. 14, the bearing part 30 extends through the passage opening 58 of the intermediate piece 22, such that the bearing part 30 engages behind the rear side of the intermediate piece 22. Here, a guide surface 61 is formed on the intermediate piece 22, wherein the bearing part 30 bears against and slides on said guide surface. The bearing part 30 thus engages behind the guide surface 61, wherein the tongue element 29 of elongate form is situated on the opposite side of the intermediate piece 22. Here, an edge of the passage opening 58 of the intermediate piece 22 engages into the groove 57 of the bearing part 30.

The slide element 25 likewise extends through the common passage opening 58 and, at one side, is supported via the spring element 27 on a wall 62 of the intermediate piece 22, said wall delimiting the passage opening 58, and at the other side, is supported on the bearing part 30. At the other side, the triggering element 10 is—as already stated—supported on the slotted guide 43 of the driver part 7, see FIG. 11. Here, both the slide element 25 and also the triggering element 10 are mounted so as to be displaceable in the sliding direction 28 perpendicular to the pivot axis 11, and are preloaded with the spring force of the spring element 27. The slide element 25 thus bears without play against the triggering element 10.

Figure 15:
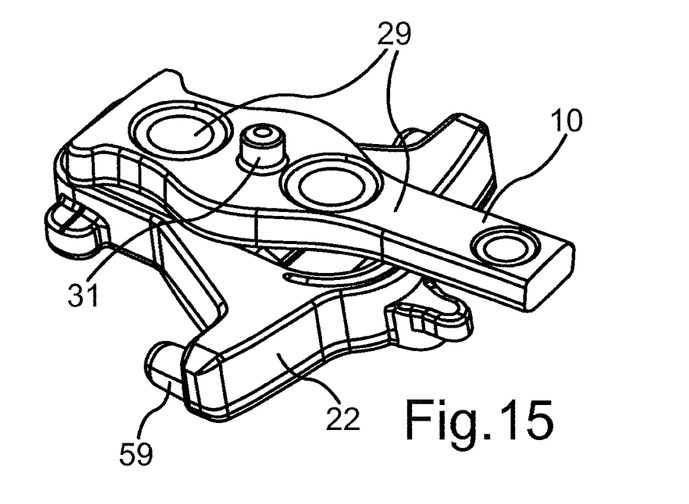

The opposite side of the triggering element 10 is illustrated in FIG. 15. Here, it is possible to particularly clearly see the peg 31 which is mounted in the slotted guide 43. The triggering element 10 is supported in the slotted guide 43 by way of the peg 31.

Figure 16:
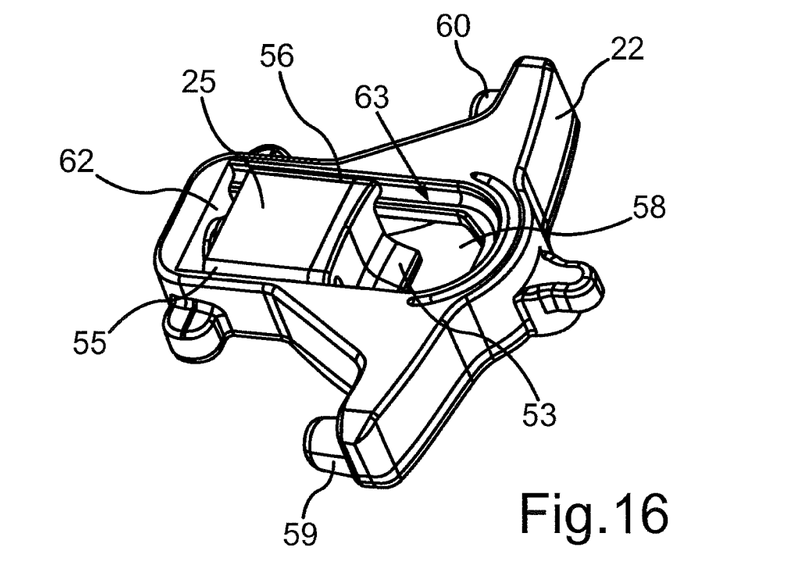

As can be seen from FIG. 16, the intermediate piece 22 has, on a side situated opposite the guide surface 61, a further guide surface 63 against which the collars 55, 56 of the slide element 25 bear and on which the slide element 25 is thus mounted in displaceable fashion. Here, the projection 53 of the slide element 25 is situated on the opposite side of the intermediate piece 22, or on the far side of the passage opening 58. At one side, the slide element 25 is thus held by means of the collars 55, 56 on the guide surface 63; at the other side, the slide element 25 is supported by way of the projection 53 on the bearing part 30 of the triggering element 10, such that the bearing part 30 is clamped between the projection 53 and the guide surface.

Figure 17:
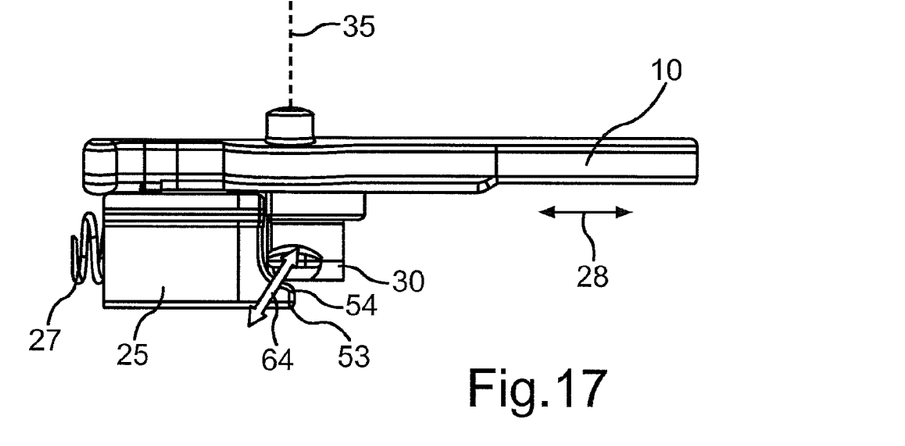

Referring now to FIG. 17, the bearing part 30 bears against the bevel 54 of the projection 53 of the slide element 25. Between the respective face sides, which face toward one another, of the slide element 25 on the one hand and of the bearing part 30 on the other hand, there is thus formed a small air gap, and said face sides are arranged with a small spacing to one another. The bearing part 30 is in contact only with the bevel 54, such that the bearing part 30 is subjected to a spring force 64 which has a force component parallel to the pivot axis 35. An arrangement is thus made possible which is free from play also in the direction parallel to the pivot axis 35. The spring force 64 thus acts on the triggering element 10 both in the sliding direction 28 and also along the pivot axis 35, such that two different directions of action are obtained with only a single spring element 27.

Figure 18:
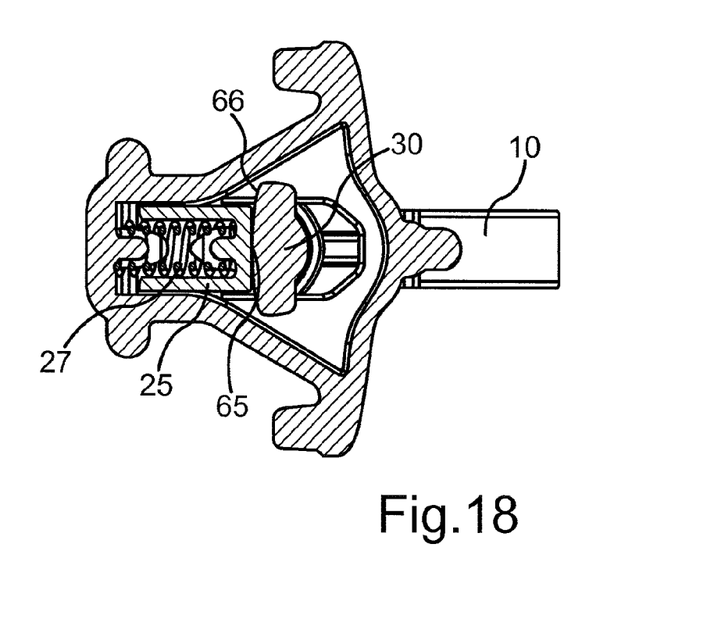
Figure 19:
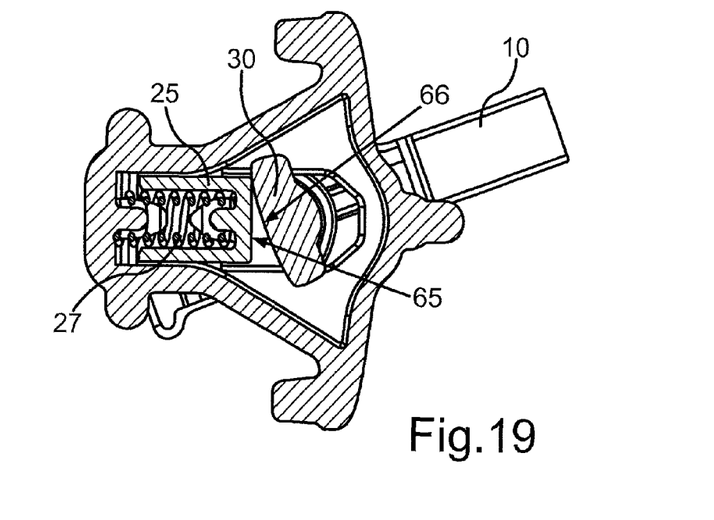

FIGS. 18 and 19 illustrate a schematic plan view of the arrangement once again, wherein, in FIG. 18, the triggering element 10 is situated in a rest position, whereas, in FIG. 19, the triggering element 10 is shown in a triggering position. It is also possible to see respective face sides 65, 66 of the slide element 25 on the one hand and of the bearing part 30 on the other hand, which face sides face toward one another. The two face sides 65, 66 each have a curvature: In the exemplary embodiment, the slide element 25 has a convex face side 65, whereas the face side 66 of the bearing part 30 is of concave form and, in effect, projects into the convex face side 65. In one embodiment, it is provided here that the radius of curvature of the face side 65 of the slide element 25 is greater than or equal to the radius of curvature of the bearing part 30. It is thus possible for clacking noises during the resetting movement of the actuating lever 2 to be eliminated.

In the triggering position of the triggering element 10 illustrated in FIG. 19, said triggering element 10 presses the driver part 7 against the respective web 50, 51, such that the driver part 7 is moved into the initial position.

Figures 20A, 20B:
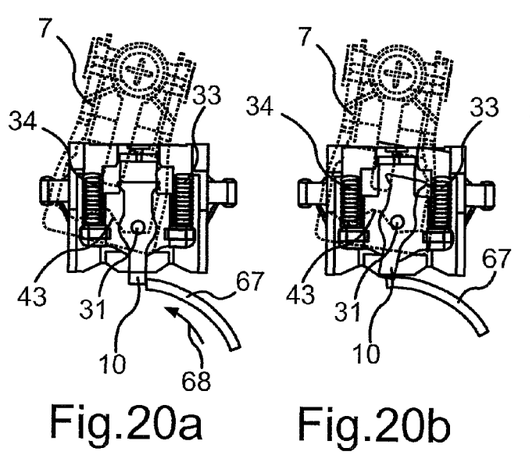
FIGS. 20a to c each show a plan view of the steering-column switch unit, with a resetting movement of the driver part and thus of an actuating lever being explained in more detail.
Figure 20C:
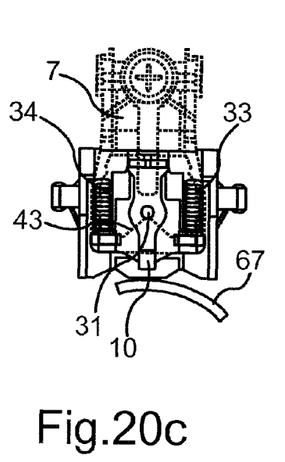

Referring now to FIGS. 20a to 20c, a triggering process of the actuating lever 2 and of the driver part 7 will be explained in more detail. In FIG. 20a, the driver part 7 is situated in the actuated position, in which the turn indicator is activated. The vehicle driver then rotates the steering wheel such that an element 67 connected to the steering spindle is moved in the direction of rotation of the steering wheel along an arc, as per the arrow 68. The element 67 then actuates the triggering element 10, which is pivoted, specifically about the pivot axis 35, from the rest position illustrated in FIG. 20a into a triggering position illustrated in FIG. 20b. In said position, the triggering element 10 pushes the driver part 7 such that the driver part 7 is moved back into the initial position. Here, the peg 31 slides along the slotted guide 43, such that the triggering element 10 is also displaced slightly in the sliding direction 28. FIG. 20c illustrates the initial position of the driver part 7, with the triggering element 10 situated in the rest position again.

The invention claimed is:

1. A steering-column switch unit for a motor vehicle, comprising:
   a driver part to which an actuating lever is connected and which is mounted so as to be pivotable about a pivot axis between an initial position and an actuated position,
      wherein the driver part has an arm which extends perpendicular to the pivot axis in the direction of a steering spindle, and which projects from a main body of the driver part,
   at least one electrical contact element;
   at least one second contact element;
   a resetting device with a triggering element for resetting the driver part and the actuating lever, from the actuated position into the initial position;
   at least one electronic component; and
   at least one circuit board;

wherein the triggering element has a first face defining a plane, the plane extending perpendicular from the pivot axis, and the first face facing a direction parallel to the pivot axis, wherein the arm includes:
- a second face facing the first face of the triggering element, and
- a third face on which the at least one electrical contact element is provided and the third face being opposite of the second face, wherein the circuit board includes a fourth face and a fifth face,
- the fourth face being provided facing to the third face such that the at least one electrical contact element and at least one second contact element may be electrically coupled,
- the at least one electronic component being provided on the fifth face, the fifth face being opposite of the fourth face, and wherein the at least one second contact element being in electrical connection with the at least one electronic component through the at least one circuit board.

2. The steering-column switch unit according to claim 1, wherein a slotted guide, for a peg of the triggering element is formed on the arm, along which guide the peg can move during the movement of the actuating lever between the initial position and the actuated position.

3. The steering-column switch unit according to claim 2, wherein the guide is formed protruding in the direction of the at least one electrical contact element.

4. The steering-column switch unit according to claim 1, wherein the resetting device is arranged on a detent part which has a detent structure for the engagement of the actuating lever with detent action.

5. The steering-column switch unit according to claim 1, wherein the triggering element is mounted on an intermediate piece so as to be pivotable about a pivot axis between a rest position and a triggering position in which the driver part is moved into the initial position, wherein the triggering element is furthermore mounted on the intermediate piece so as to be displaceable in a sliding direction perpendicular to the pivot axis, and wherein a spring element is provided for generating a spring force which acts parallel to the sliding direction and with which the triggering element is arranged under preload on the intermediate piece.

6. The steering-column switch unit according to claim 5, wherein the intermediate piece has a guide surface which is formed perpendicularly to the pivot axis and on which the triggering element is mounted, and wherein the spring element is provided which press the triggering element against the guide surface in a direction parallel to the pivot axis.

7. The steering-column switch unit according to claim 5, wherein the steering-column switch unit has a switch override protection unit with a switch override spring which, in a switch override situation, permits a movement of the intermediate piece relative to the actuating lever.

8. The steering-column switch unit according to claim 7, wherein the switch override spring and the spring element are arranged adjacent to one another in a direction perpendicular to the sliding direction.

9. Motor vehicle having a steering-column switch unit as claimed in claim 1.

10. The steering-column switch according to claim 1 further comprising at least one second actuating lever connected to the driver part and the at least one circuit board, wherein the at least one circuit board is common to at least one switch associated with the actuating lever and at least one other switch associated with the at least one second actuating lever.

* * * * *

UNITED STATES PATENT AND TRADEMARK OFFICE
CERTIFICATE OF CORRECTION

PATENT NO. : 9,902,316 B2  
APPLICATION NO. : 14/368006  
DATED : February 27, 2018  
INVENTOR(S) : Rainer Lipfert et al.

Page 1 of 1

It is certified that error appears in the above-identified patent and that said Letters Patent is hereby corrected as shown below:

On the Title Page

Item (71), the Applicant section reads "Valeo Schalter and Sensoren GmbH" but should read -- Valeo Schalter und Sensoren GmbH --.

Signed and Sealed this  
Fifth Day of June, 2018

Andrei Iancu  
*Director of the United States Patent and Trademark Office*